US007303977B2

(12) United States Patent
Voronov et al.

(10) Patent No.: US 7,303,977 B2
(45) Date of Patent: Dec. 4, 2007

(54) LASER MICROMACHINING METHOD

(75) Inventors: Sergei L. Voronov, Chandler, AZ (US); Christopher L. Rumer, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 297 days.

(21) Appl. No.: 10/985,572

(22) Filed: Nov. 10, 2004

(65) Prior Publication Data

US 2006/0099810 A1   May 11, 2006

(51) Int. Cl.
*H01L 21/00* (2006.01)
(52) U.S. Cl. ................ 438/463; 438/460; 257/E21.001
(58) Field of Classification Search ................ 438/460
See application file for complete search history.

(56) References Cited

U.S. PATENT DOCUMENTS

| | | | |
|---|---|---|---|
| 5,726,855 A | | 3/1998 | Mourou et al. |
| 6,333,485 B1 * | | 12/2001 | Haight et al. .......... 219/121.68 |
| 6,377,436 B1 | | 4/2002 | Margolin |
| 6,770,544 B2 * | | 8/2004 | Sawada ...................... 438/462 |

OTHER PUBLICATIONS

Tzortzakis, S. et al, "Sub-picosecond UV Laser Pulse Filamentation in Atmosphere," CLEO Europe-IQEC 2000, Nice, France, Sep. 10-15, 2000, 2 pages.
Tzortzakis, S. et al, "Long Connected Plasma Channels in Air Produced by Ultrashort UV Laser Pulses," Quantum Electronics and Laser Science Conference (QELS 2000), San Francisco, CA, May 7-12, 2000, pp. 143-144.
Schaffer, Chris B. et al., "Microscopic Bulk Damage in Dielectric Materials using Nanojoule Femtosecond Laser Pulses," Quantum Electronics and Laser Science/CLEO 1999, Baltimore, Maryland, May 23-28, 1999, pp. 232-233.
Schillinger, H. et al., "Electrical Conductivity of Long Plasma Channels in Air Generated by Self-Guided Femtosecond Laser Pulses", Applied Physics B, vol. 68, No. 4, 1999, pp. 753-756.
Shah, Lawrence et al., "Self-Focusing During Femtosecond Micromachining of Silicate Glasses," IEEE Journal of Quantum Electronics, vol. 40, No. 1, Jan. 2004, pp. 57-68.
La Fontaine, B. et al., "Filamentation of Ultrashort Pulse Laser Beams Resulting from their Propagation Over Long Distances in Air," Physics of Plasmas, vol. 6, No. 5, May 1999, pp. 1615-1621.
Ashcom, Jonathan B., "The Role of Focusing in the Interaction of Femtosecond Laser Pulses with Transparent Materials," student thesis, Harvard University Department of Physics, Jan. 2003, 158 pages.

* cited by examiner

*Primary Examiner*—Michael Lebentritt
*Assistant Examiner*—Angel Roman

(57) ABSTRACT

A laser micromachining method is disclosed wherein a workpiece is milled using an incident beam from a laser beam focused above the surface of the workpiece. The incident beam is guided by a plasma channel generated by the incident beam. The plasma channel, which has a relatively constant diameter over an extended distance, is generated by continual Kerr effect self-focusing balanced by ionization of air beam defocusing.

17 Claims, 1 Drawing Sheet

LASER MICROMACHINING METHOD

FIELD OF THE INVENTION

Embodiments of the present invention relate generally to micromachining and more specifically to laser micromachining of semiconductor substrates.

BACKGROUND OF THE INVENTION

Conventional semiconductor wafer singulation is done using mechanical dicing saws. Next generation semiconductor devices, however, will use new materials, such as low dielectric constant (low-k) interlayer dielectric layers (ILDs) that may be incapable of withstanding the sheer forces exerted during the wafer sawing process. Lasers, either alone or in combination with saws, are being considered as alternatives to conventional sawing. However, the integration of laser technology to perform die singulation is not without its challenges.

Conventional lasers (traditionally focused lasers having long pulse durations, such as nanosecond lasers) are currently incapable of producing high-quality cuts through a semiconductor wafer. This is because the laser's fluence is not intense enough to ablate completely through the entire thickness of the wafer. Loosening the laser's focus geometry to increase the laser's depth-of-focus does not solve the problem because enlarging the laser's depth-of-focus also reduces the laser's fluence and ablation capabilities. Conventional focusing does not improve dicing/milling capabilities because even tight focusing cannot produce the amount of fluence needed to ablate entirely through the thickness of the substrate. Increasing overall laser power to compensate for this limitation generates heat and compromises the quality of the laser cut. Heat produces thermal effects and mechanical damage. Both of which can impact a semiconductor device performance and yield.

A number of approaches are being investigated to overcome these problems. One includes using a combination of laser scribing and mechanical dicing to singulate the wafer. This approach uses multiple passes of a laser to remove scribe line (street region) material prior to saw singulating. A disadvantage of using this approach is that two different processes must be combined to singulate the wafer. The combination is more complicated, costly, and slower than using a single laser or sawing process.

Another approach uses a galvanometer steered laser to perform a series laser beam raster scans at varying focal depths to perform singulation. Major disadvantages of this process include its low throughput (low number of wafers-per-hour) and inaccurate laser beam placement (10 microns or more beam pointing instability). Unless process throughputs can be increased, this approach will probably not be considered a viable dicing alternative by high volume semiconductor manufacturers.

Yet another approach projects a laser through stream of water (water jet) onto the wafer. The water jet functions as a waveguide for the laser and produces a collimated high intensity beam. This approach's advantages include its high-throughput singulation capabilities since the laser beam stays collimated throughout whole thickness of a semiconductor wafer, and its inherent ability to cool the wafer surface using the stream of water. Disadvantages of using this process include the physical force of the water jet and the water cavitation pressure wave that forms in the trench during processing. Both of which can result in increased defect densities as well as delamination and cracking of layers formed on the wafer.

Figure 1:
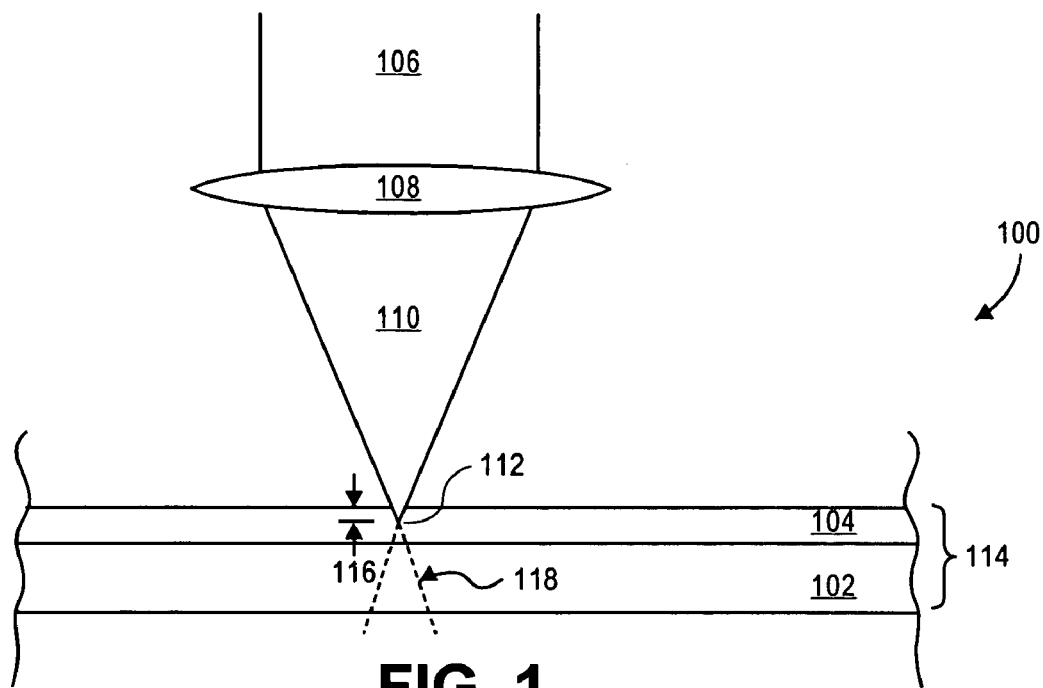
FIG. 1 illustrates the micromachining of a semiconductor substrate using a conventional laser beam.

It will be appreciated that for simplicity and clarity of illustration, elements in the drawings have not necessarily been drawn to scale. For example, the dimensions of some of the elements may be exaggerated relative to other elements for clarity. Where considered appropriate, reference numerals have been repeated among the drawings to indicate corresponding or analogous elements.

DETAILED DESCRIPTION

In the following detailed description, a method for laser micromachining is disclosed. Reference is made to the accompanying drawings within which are shown, by way of illustration, specific embodiments by which the present invention may be practiced. It is to be understood that other embodiments may exist and that other structural changes may be made without departing from the scope and spirit of the present invention.

Using embodiments of the present invention, collimated beams, incident to converging beam geometry pulses from an ultrafast laser, can be used to scribe, dice, or mill a workpiece. The collimated beam can maintain a uniform diameter and high intensity optical energy while ablating through the entire thickness of the workpiece. In one embodiment, the workpiece is a semiconductor wafer. Embodiments of the present invention overcome depth-of-focus problems encountered with conventional lasers. And, because ablation is the result of using a short pulse duration (ultrafast) laser beam, which inherently produces smaller heat-affected zones than in the case of conventional lasers, reduced thermal damage occurs. These embodiments and variations thereof may be better understood with respect to FIGS. 1-2.

Shown in FIG. 1 is an illustration of a pulse 106 from a conventional nanosecond laser. The pulse is focused using lens 108. The focused pulse 110 converges at a point 112 (waist of the beam) on semiconductor wafer 114. Semiconductor wafer 114 includes various layers 104 as known to one of ordinary skill formed over a semiconductor substrate 102. As shown in FIG. 1, the depth-of-focus 116 (i.e. the depth at which ablation of material on the semiconductor wafer can effectively occur. For the purpose of this specification the depth-of-focus refers to the distance beyond the waist of the beam where the beam's intensity does not drop by more than a factor of two times (2×) the intensity of the beam at the waist) does not extend through the various layers 104 formed over the semiconductor substrate 102. Beyond the point 112, the laser's beam defocuses 118 and the beam's fluence will eventually become insufficient to ablate completely through the semiconductor wafer 114. Consequently, multiple passes of the laser as well as adjustments to the laser's focal depth are necessary to completely scribe through the various layers 104 or to dice/mill through the entire thickness of semiconductor wafer 114.

Figure 2:
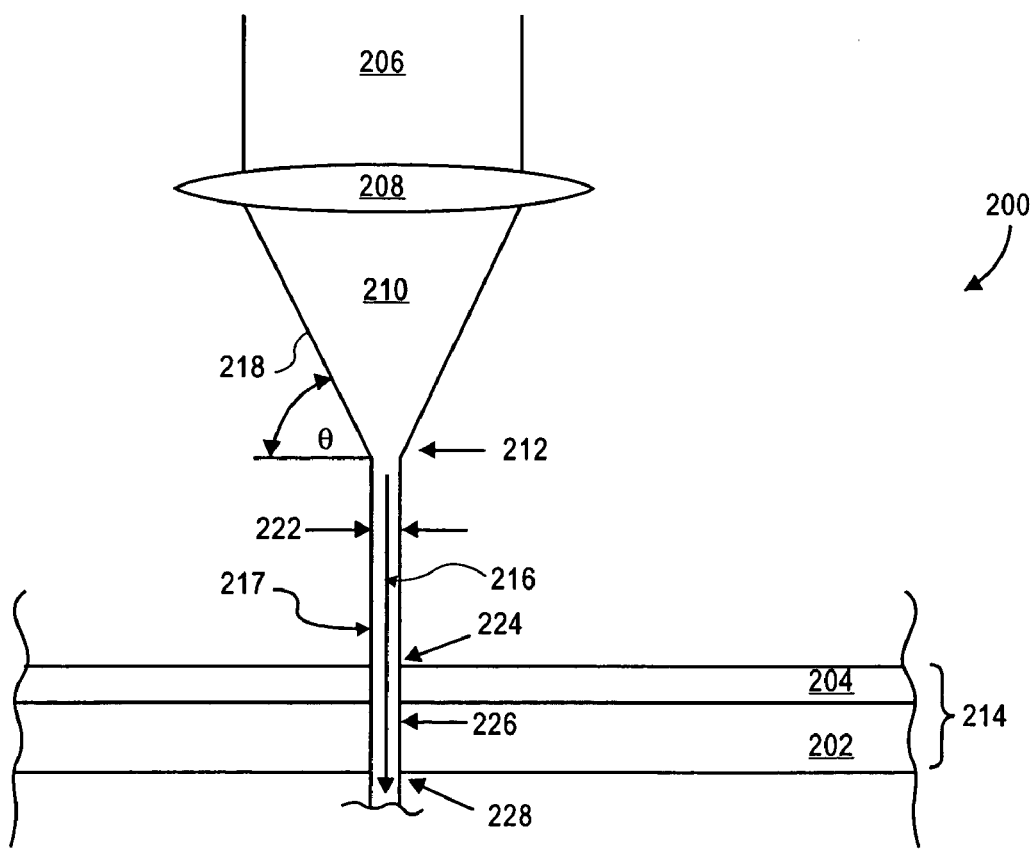
FIG. 2 illustrates the micromachining of a semiconductor substrate using a laser beam that is self-focused in air in accordance with an embodiment of the present invention.

Shown in FIG. 2 is an embodiment of the present invention that overcomes the depth of focus problems encountered with conventional laser scribing/dicing methods and systems. In one embodiment, the laser source can be a relatively weak pulse energy (i.e., on the order of 1 millijoule or more), short pulse width (i.e. pulse duration on the order of 500 femtoseconds or less) laser, generally referred to as an ultrafast laser (i.e., a short pulse duration laser). One of ordinary skill appreciates that ultrafast lasers include picosecond lasers, femtosecond lasers, and the like. In one embodiment the ultrafast laser has a pulse energy of approximately 1 millijoule or more, a pulse duration of 500 femtoseconds or less, and repetition rate of 1 MHz or less.

The ultrafast laser's beam 206 is loosely focused via lens 208 upon a point 212 above the surface of the substrate 214. For the purpose of this specification, the degree of looseness is a function of the size of angle θ shown in FIG. 2. As the size of angle θ increases, so does the focal looseness of converging beam 210. Looseness is adjusted so that the laser beam's optical intensity (power transmitted per unit area) reaches a point where non-linear effects impact the manner in which the light propagates. Non-linear effects occur when the laser beam's optical intensity alters the properties of the medium in which it is traveling. In air, non-linear effects begin to impact focusing when the laser's intensity reaches approximately 10E14 Watts per centimeter squared (W/cm$^2$).

Non-linear effects cause different regions of gaussian beams (i.e., beams that are brighter at their center than their edges) traveling in air to move at different phase speeds. Since light at the center of the beam has a higher intensity than the light toward the edge of the beam, the index of refraction at the beam's center will correspondingly be greater than the index of refraction at the beam's edge (and also greater than the index of refraction of air). The non-uniform variation in the air's index of refraction (also known as the Kerr effect) causes light at the center of the beam to slow. As a result, light at the edge of the beam bends toward the center. This causes the beam to converge on itself and self-focus.

Self-focusing can significantly increase the incident beam's optical intensity. Self-focused beams can have diameters that approach tens of microns. To the extent that power remains relatively constant, the reduction in area (as compared to the area of a conventional laser beam) can significantly increase the optical intensity of the beam. When the beam's optical intensity due to self-focusing exceeds the ionization energy of air (or whatever the medium is that the light is transmitting through) multiphoton ionization occurs and a plasma is created that surrounds the beam.

The plasma, having a refractive index lower than that of air (i.e. the plasma is a positive dispersive medium), causes the beam to defocus. That is, as a result of the presence of the positive dispersive medium, the index of refraction at the center of the beam changes and becomes smaller than the index of refraction at the edge of the beam (and also is smaller than the index of refraction of air). The change in the index of refraction initiates beam defocusing, which correspondingly reduces the beam's intensity. When defocusing causes the beam's intensity to fall below the ionization threshold of air, the plasma extinguishes. After the plasma extinguishes, the Kerr effect can then switch back on and self-focusing resumes. The processes of Kerr effect self-focusing and defocusing continually repeat themselves and eventually a repetitive dynamic equilibrium of successive self-focusing and defocusing is reached.

Successive Kerr effect self-focusing and plasma defocusing results in the formation of a narrow high-energy incident beam 216 propagating in a plasma channel 217 (filament). The plasma channel 217 has a relatively uniform diameter 222 and guides the incident beam 216 and thereby functions as a waveguide. The incident beam 216 is collimated because it propagates without significant beam dispersion due to diffraction. The distance over which the collimated beam travels can exceed several millimeters. The ability of the incident beam 216 to propagate over extended distances without the usual broadening due to diffraction makes it beneficial for laser scribing/dicing applications. As shown in FIG. 2, the incident beam 216 can be used to dice through the entire thickness of the semiconductor wafer 214, including the various layers 204 and the semiconductor substrate 202.

Since the incident beam is collimated and does not significantly defocus due to diffraction, its intensity remains relatively constant over the extended distances. Consequently, depth-of-focus is not as much of a limitation with respect to optical intensity, as it was with conventional prior art laser systems. Since the incident beam's optical intensity is relatively independent of a depth-of-focus, it can remain elevated for greater distances. Micromachining through an entire thickness of semiconductor substrate can therefore be accomplished because the beams intensity at points 224, 226, and 228, for example remains relatively constant. After ablation of the substrate material by the incident beam is initiated, it is believed that the Kerr effect continues to be balanced by defocusing caused by the plasma in air created by the high-intensity laser pulse, the plasma or vapor generated by the material being removed during the ablation process, or a combination of both.

The laser source can be a low pulse energy but high peak power ultrafast laser. High-power ultrafast lasers can advantageously be used as the laser source because they emit relatively low pulse energies (on the order of 1 millijoule) and yet produce very high peak optical intensities capable of initiating self-focusing. Moreover, unlike conventional nanosecond lasers, which ablate material by transferring thermal energy to the materials lattice system to induce melting and evaporation, ultrafast lasers, which ionize energy system of a material due to single- or multi-photon ionization, have pulse durations much shorter than electron-phonon interaction time in the semiconductor wafer materials. These lasers produce ultrafast bond scission and ablate by exciting the material's electrons to higher energy states (i.e. to the conduction band) or even the vacuum level directly by single- or multi-photon ionization (a nonlinear effect afforded by usage of ultrafast lasers) before energy transfer from the electronic system to the lattice system occurs. Therefore material can be removed with significantly reduced thermal and mechanical stress as compared to prior art laser ablation methods.

A one millijoule laser (i.e. Ti:Sapphire, fiber, or the like) having a 500 femtosecond pulse duration and a diameter of a few millimeters will, after being loosely focused, self-focus spatially and can generate an incident beam having a diameter of approximately 50 microns and having an Intensity (Intensity=Pulse_Energy/(Duration*Area)) of approximately 1.5*10E14 Watts per centimeter squared. This intensity is sufficient to ionize atoms and molecules having ionization energies approximately 14 electron-volts (eV) or less. This would include for example, atmospheric compounds (i.e. compounds in air), such as oxygen (O2), Water (H2O), and carbon dioxide (CO2), and solid materials in the semiconductor wafer, such as monocrystalline silicon, polysilicon, and amorphous silicon (Si), carbon (c), copper (CU), silicon dioxide, silicon nitrides, and silicon carbides.

Here, the optical intensity required to initiate Kerr effect self-focusing and atmospheric ionization (approximately $10E14$ W/cm$^2$) is also sufficient to ionize and ablate both silicon and silicon dioxide. The ionization energy of silicon is 8.15 eV (which requires an intensity of $7.7*10E12$ W/cm$^2$ for ablation to occur) and the ionization energy of silicon dioxide is approximately 9 eV (which requires an intensity of $2.6*10E13$ W/cm$^2$ for ablation to occur). Therefore, lasers capable of producing atmospheric ionization should also be able to ablate silicon and silicon dioxide materials in semiconductor wafers.

Thus, a 500 femtosecond laser pulse having pulse energy of 1 millijoule focused to a 50 micron diameter will produce an optical intensity of approximately $10E14$ W/cm$^2$. This intensity is sufficient to initiate Kerr effect self-focusing in air and thereby generate a high-intensity pulse. Successive self-focusing due to the Kerr effect and defocusing caused by the plasma subsequently occurs. The balance of the two effects leads to a dynamic equilibrium that forms a plasma channel having a relatively uniform diameter and which extends to several millimeters or more. The plasma channel functions as a waveguide for the high intensity pulse. Since the intensity of the pulse is sufficient to ablate both silicon and silicon dioxide, and the thickness of a semiconductor wafer is usually no more than 1 mm (a relatively small fraction of the length of the plasma column), the wafers can be scribed, or diced/milled completely through while at the same time preserving the scribe trench quality and/or diced/milled wall topology. This represents a significant advantage and advancement over the prior art.

Embodiments of the present invention disclose a semiconductor substrate micromachining method that can reduce depth of focus limitations and thermal effects problems encountered with conventional laser scribing/dicing. Embodiments disclosed herein can be used in combination or individually to scribe, dice, mill, and drill structures (such as vias) in semiconductor substrates. Scribing, dicing, milling, and drilling efficiency is improved as the intensity of the incident beam, generated by a balanced self-focusing and plasma defocusing, is much higher than that of the source laser throughout the material thickness. In addition, the beams high intensity and relatively uniform diameter eliminates/reduces depth of focus problems encountered with prior art laser systems. The increased intensity and uniform diameter can facilitate scribing, dicing, milling, and drilling of semiconductor substrates by reducing the number of passes required by the laser and by reducing/eliminating the need to adjust to the laster's focus depth between passes. And, because ablation is the result of using a short pulse width laser beam, which is inherently produces smaller heat-affected zone than with conventional lasers, reduced thermal damage occurs.

The various implementations described above have been presented by way of example only and not limitation. Having thus described in detail embodiments of the present invention, it is understood that the invention defined by the appended claims is not to be limited by particular details set forth in the above description, as many apparent variations thereof are possible without departing from the spirit or scope thereof.

What is claimed is:

1. A method comprising:
   focusing a laser beam above a surface of a workpiece;
   generating an incident beam from the laser beam; and
   ablating portions of the workpiece using the incident beam,
   wherein:
   focusing the laser beam initiates self-focusing of the laser beam and generates a first self-focused beam potion; and
   the first self-focused beam portion generates a plasma that defocuses the first self-focused beam portion and extinguishes the plasma.

2. The method of claim 1, wherein extinguishing the plasma facilitates formation of a second self-focused beam portion.

3. The method of claim 2, wherein balanced self-focusing and plasma defocusing generates a plasma channel.

4. The method of claim 3, wherein the plasma channel guides the incident beam.

5. The method of claim 4, wherein the workpiece is further characterized as a semiconductor wafer.

6. The method of claim 5, wherein ablating portions of the workpiece is further characterized as scribing the semiconductor wafer.

7. The method of claim 5, wherein ablating portions of the workpiece is further characterized as dicing the semiconductor wafer.

8. The method of claim 5, wherein ablating portions of the workpiece is further characterized as milling a via in the semiconductor wafer.

9. A method comprising:
   projecting a laser pulse toward a surface of a semiconductor wafer, wherein:
   an optical intensity of the laser pulse initiates self-focusing and generates an incident beam;
   self-focusing of the incident beam generates a plasma;
   defocusing caused by the plasma, extinguishes the plasma and again initiates self-focusing of the incident beam, and
   successive self-focusing and defocusing generates a channel that guides the incident beam; and
   ablating portions of the semiconductor wafer using the incident beam.

10. The method of claim 9, wherein projecting the laser pulse toward the surface of the semiconductor wafer is further characterized as focusing the laser pulse above the surface of the semiconductor wafer.

11. The method of claim 10, wherein projecting the laser pulse toward the surface of the semiconductor wafer is further characterized as projecting an ultrafast laser pulse toward the surface of the semiconductor wafer.

12. The method of claim 11, wherein ablating portions of the semiconductor wafer is further characterized as scribing the semiconductor wafer, dicing the semiconductor wafer, or milling a via in the semiconductor wafer.

13. A semiconductor device substrate that has been micromachined using an incident beam from a laser beam focused above a surface of a semiconductor wafer, wherein the incident beam is the product of balanced laser self-focusing and plasma defocusing.

14. A method for micromachining a semiconductor wafer comprising:
   focusing ultrafast laser pulses above a surface of the semiconductor wafer; and
   using incident beams guided by balanced self-focusing and defocusing of the ultrafast laser pulses to ablate portions of the semiconductor wafer, wherein:
 defocusing comprises passing a self-focused component of the incident beam through a positive dispersive medium; and
 passing a self-focused component of the incident beam through a positive dispersive medium is further characterized as passing the self-focused component of the incident beam through a plasma created by ionization of a medium through which the incident beam passes.

15. The method of claim 14, wherein the medium is further characterized as air.

16. The method of claim 14, wherein the medium is further characterized as a portion of the semiconductor wafer.

17. The method of claim 16, wherein ablating portions of the semiconductor wafer is further characterized as a process selected from the group consisting of scribing the semiconductor wafer, dicing the semiconductor wafer, and milling a via in the semiconductor wafer.

* * * * *